United States Patent [19]
Heidrich et al.

[11] 3,841,498
[45] Oct. 15, 1974

[54] DEVICE FOR TURNING AND TRANSPORTING HEAVY WORKPIECES

[75] Inventors: Klaus Heidrich, Netphen-Dreistiefenbach; Lothar Kietz, Freudenberg-Lindenberg; Werner Sziburies, Huttental-Weidenau, all of Germany

[73] Assignee: Kabelschlepp Gesellschaft mit beschrankt Haftung, Siegen, Germany

[22] Filed: July 27, 1973

[21] Appl. No.: 383,179

[52] U.S. Cl. ............................................. 214/1 QC
[51] Int. Cl. .......................................... B65g 17/48
[58] Field of Search ................. 214/1 Q, 1 QC, 1 R

[56] References Cited
UNITED STATES PATENTS

| 740,100 | 9/1903 | Devine | 214/1 QC |
| 1,498,153 | 6/1924 | Cull | 214/1 QC |

*Primary Examiner*—Frank E. Werner
*Attorney, Agent, or Firm*—Walter Becker

[57] ABSTRACT

A device for turning and transporting heavy workpieces, which includes a traverse with suspending means arranged centrally on the traverse while a driving roller is arranged at each end of the traverse for an endless belt to have a workpiece suspended therein, the driving rollers being mounted on the driving shaft therefor in a semi-cardanic manner.

3 Claims, 3 Drawing Figures

DEVICE FOR TURNING AND TRANSPORTING HEAVY WORKPIECES

The present invention relates to a device for turning and transporting heavy workpieces which has a traverse with a centrally arranged suspending device and with a driving roll arranged on each end of a shaft for an endless belt or strap for suspending the workpiece.

Heavy workpieces have during their manufacturing process to be turned a plurality of times and have to be transported. When a heavy workpiece, for instance a machine bed, has to be turned, it is, as a rule, lifted by a crane and is reset several times. Such manipulation entails many risks for the workpiece itself as well as for the operators, and it takes up considerable time because it has to be carried out with utmost care.

A device for turning and transporting heavy workpieces has become known which comprises a traverse with a centrally arranged suspending device and with a chain drum arranged on each end of the traverse for an endless chain for suspending the workpiece. However, not every workpiece can be turned and transported by means of a chain. There exist many exceptions where a very careful treatment of the workpiece by means of flexible or soft belts or strape becomes necessary. Moreover, there are many irregularly designed workpieces which have different dimensions at their ends. With such workpieces it is difficult to place the center of gravity precisely below the point of engagement of the suspending device in order to balance the traverse as to the horizontal plane. Therefore, the traverse will in many instances be slightly inclined so that the chains or straps which by a pendulum motion take up a vertical position will no longer extend at a right angle with regard to the chain drum or the driving roll. In such an instance there exists the danger that during the turning movement the chains will jump off their chain drum or that the straps will roll off their driving rolls.

It is, therefore, an object of the present invention to improve the above referred to heretofore known device for turning and transporting heavy workpieces so that also irregular workpieces can with inclined traverse be turned and transported in a careful and safe manner.

This object and other objects and advantages of the invention will appear more clearly from the following specification in connection with the accompanying drawings, in which:

FIG. 3 illustrates a perspective view of a section of a strap for use in the device of the invention.

Figure 1:
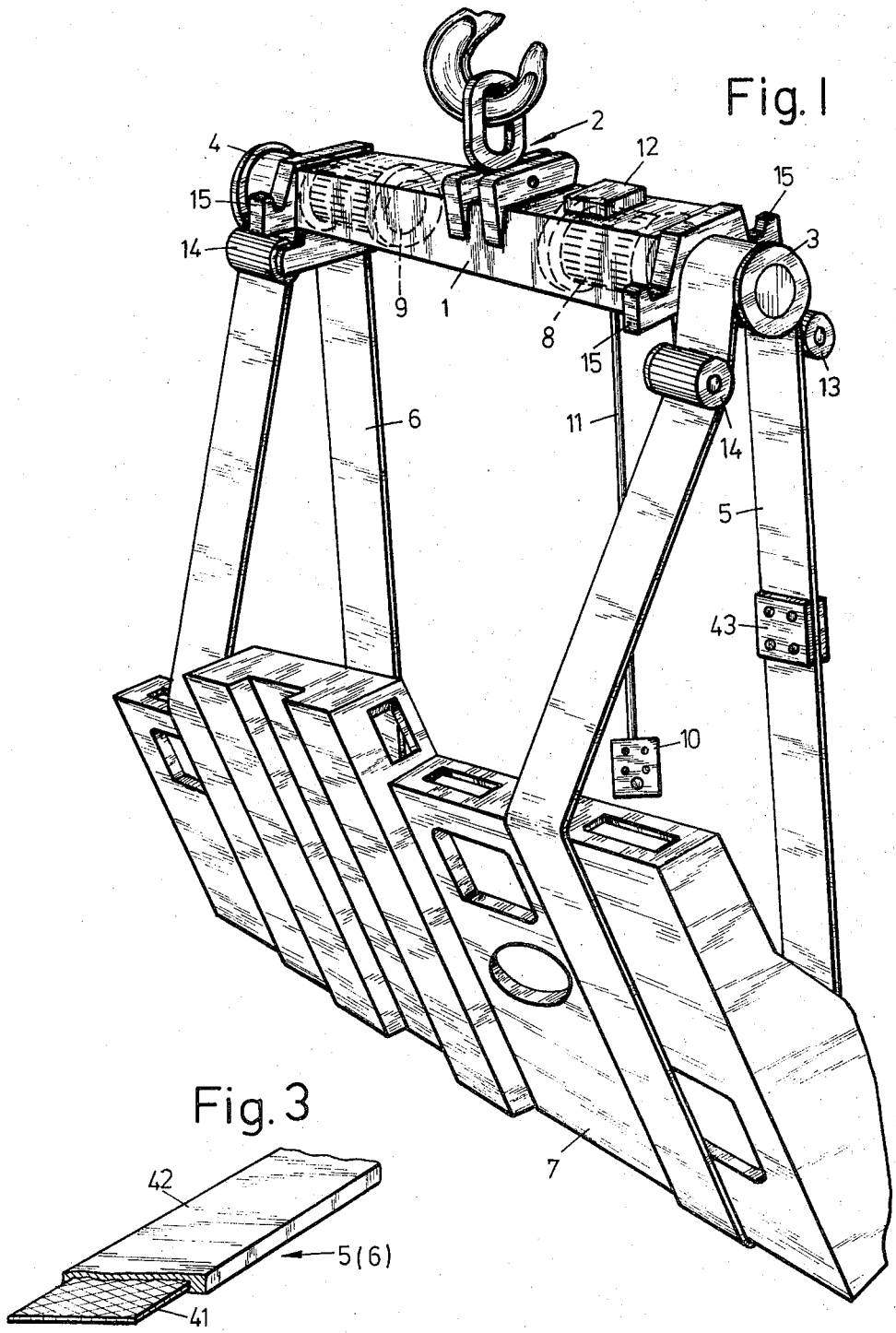
FIG. 1 is an isometric view of a device according to the invention for turning and transporting heavy workpieces.
Figure 2:
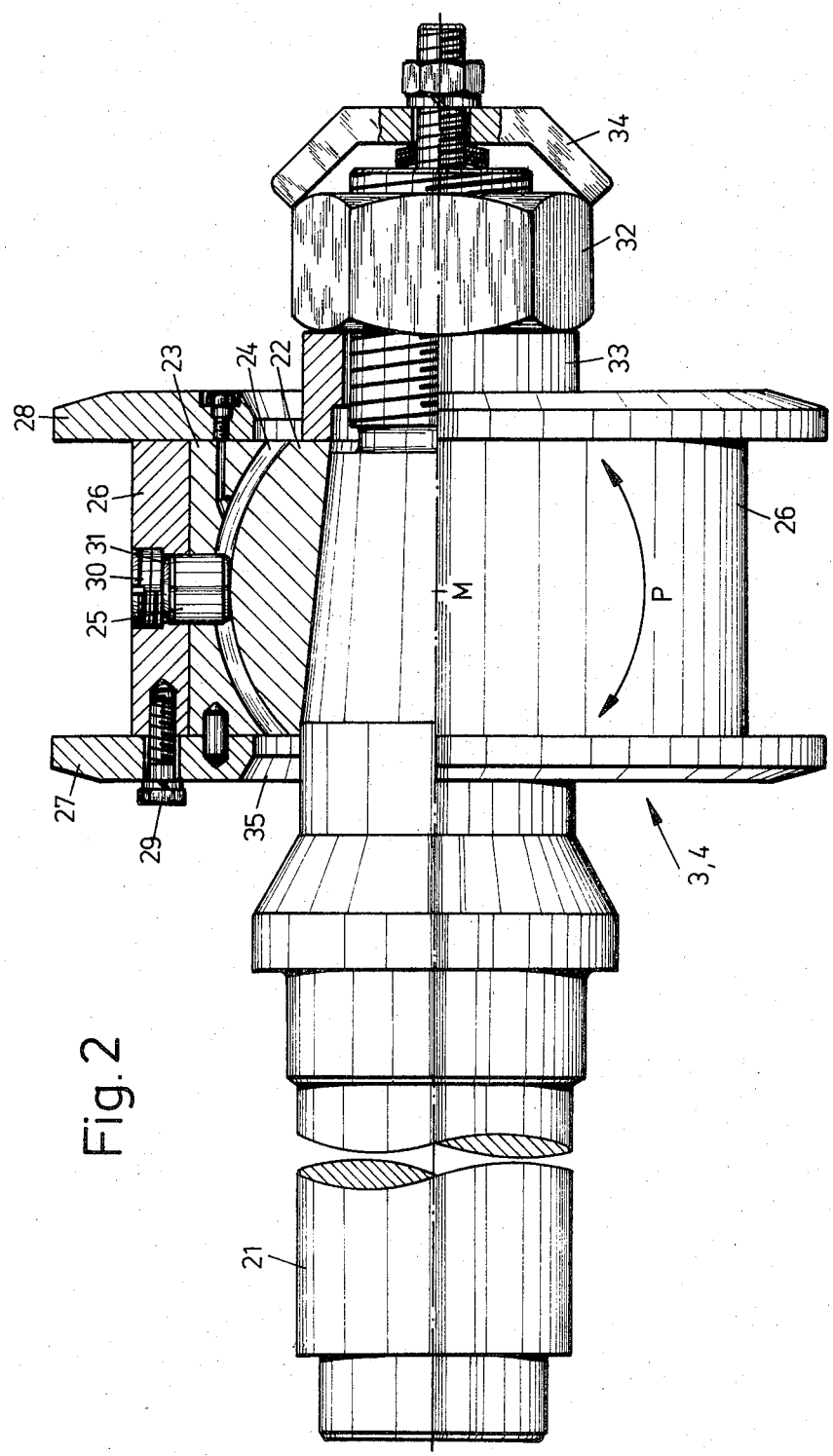
FIG. 2 illustrates a side view and partly a section of a semi-cardanic mounting for the driving rolls of the straps as used in the device according to the invention.

The device according to the present invention for turning and transporting heavy workpieces, which comprises a traverse with a centrally arranged suspending device and with a driving roll arranged on a shaft on each end of the traverse for an endless belt or strap for suspending the workpiece, is characterized primarily in that the driving rolls are mounted on the shaft in a semi-cardanic manner. According to a practical embodiment of the invention, the semi-cardanic mounting may consist of a calotte non-rotatably mounted on a shaft and provided with at least one axially extending groove and a bushing mounted on the calotte and having lateral flanges while in the bushing there is provided a cylindrical roller engaging the groove for conveying the torque. If it is desired to have a driving roller roll freely, so that no slip will occur on the workpiece, the cylindrical rollers may be removed.

Referring now to the drawings in detail, the device shown therein consists primarily of a traverse 1 with a centrally arranged suspending device 2 and with a driving roll 3, 4 arranged at each end of the traverse 1 for an endless belt or strape 5, 6 for suspending therein a workpiece 7. The driving rolls 3, 4 are in the specific embodiment shown moved by synchronous motors 8, 9 which are adapted to be switched-on and switched-off separately and which are located in the traverse designed as a hollow body. For switching-on and switching-off the electric motors 8, 9, there is provided a switchboard 10 which through a cable 11 and a connecting box 12 is electrically connected to the motors 8, 9.

Two tensioning rollers 13, 14 are respectively arranged below the driving rollers 3, 4. By means of these tensioning rollers, the looping angle of the belts or straps 5, 6 on the driving rollers 3, 4 can be increased. Moreover, between the straps 5, 6 on the traverse 1 there are provided hooks 15 for suspending therein non-illustrated transporting chains.

The driving rollers 3, 4 are mounted on shaft 21 in a semi-cardanic manner so that they will be able, in case the traverse 1 is suspended at an incline, to adapt themselves to the vertical position of the belts 5, 6. The semi-cardanic mounting consists primarily of a calotte 22 non-rotatably connected to shaft 21 and a bushing 23. The calotte 22 is provided with at least one axial groove 24 engaged by a cylindrical roller 25. Bushing 23 is arranged in a pulley 26 and between lateral flanges 27, 28 which are connected to the pulley 26 by means of screws 29.

The cylindrical rollers 25 are mounted on threaded stoppers 30 connected in the mantle of the pulley 26 and by means of a dish spring 31 are elastically pressed into the groove 24 so that the torque of the shaft 21 can be conveyed in a reliable manner. When the workpiece 7 has rather irregular dimensions, one driving roller 3, 4 may be disengaged by removing the cylindrical roller 25 so that the pertaining belt or strap 5, 6 will move freely.

The calotte 22 is by means of an inner cone connected to shaft 21 and is held by means of a nut 32 and an interposed adjusting ring 33. The nut 32 is secured by a safety washer 34. The flanges 27, 28 are at their center provided with openings 35 the diameter of which is greater than the diameter of shaft 21 in order to assure that the pulley 26 can carry out a free pendulum movement about the center M in the direction of the arrow P by an angle of not more than 45°.

As will be evident from the above, the device according to the present invention has the advantage that a precise balancing of symmetrical and also of irregularly designed workpieces is no longer necessary as it was heretofore required to bring the center of gravity precisely below the point of engagement of the suspending device. Due to their semi-cardanic suspension, the driving rollers are able to adapt themselves at an angle of up to 45° to the vertical position of the belts or straps.

It is, of course, to be understood that the present invention is, by no means, limited to the specific showing in the drawings but also comprises any modifications within the scope of the appended claims.

What we claim is:

1. A device for turning and transporting heavy workpieces, which comprises a traverse, suspension means connected to said traverse at the central portion thereof for selectively suspending said traverse on supporting means, two driving rollers respectively arranged at each end of said traverse for driving an endless belt adapted to support a workpiece, motor means associated with said traverse, and shaft means drivingly connecting said shaft means with said rollers, said driving rollers being mounted on said shaft means in a semi-cardanic manner.

2. A device for turning and transporting heavy workpieces, which includes a hollow traverse, suspension means connected to said traverse at the central portion thereof for selectively suspending said traverse on supporting means, two driving rollers respectively arranged at each end of said traverse for driving an endless belt adapted to support a workpiece, two synchronous motors arranged within said traverse, and two shafts respectively drivingly connecting said motors with said driving rollers, said driving rollers being mounted on said shaft means in a semi-cardanic manner.

3. A device according to claim 1, in which the semi-cardanic mounting of each of said driving rollers includes a calotte non-rotatably connected to the pertaining shaft means, said calotte being provided with at least one axially extending groove, a belt pulley surrounding said calotte in spaced relationship thereto and having an annular central portion and lateral flanges connected to said central portion, a bushing interposed between said central portion and said calotte and being connected to at least one of said flanges, and cylindrical roller means connected to said central portion and engaging said groove for conveying a torque from said shaft means to said belt pulley.

* * * * *

UNITED STATES PATENT OFFICE
CERTIFICATE OF CORRECTION

Patent No. 3,841,498     Dated October 15, 1974

Inventor(s) Klaus Heidrich et al.

It is certified that error appears in the above-identified patent and that said Letters Patent are hereby corrected as shown below:

Assignee's name should read -- Kabelschlepp Gesellschaft mit beschrankter Haftung --.  insert -- [30] Foreign Application Priority Data Austria          14A 6611/72      July 31, 1972 --.

Signed and sealed this 14th day of January 1975.

(SEAL)
Attest:

McCOY M. GIBSON JR.           C. MARSHALL DANN
Attesting Officer             Commissioner of Patents